April 2, 1940.  T. A. JOHNSON  2,195,699
PHOTOGRAPHIC FINGER PRINTING APPARATUS
Filed Oct. 23, 1939
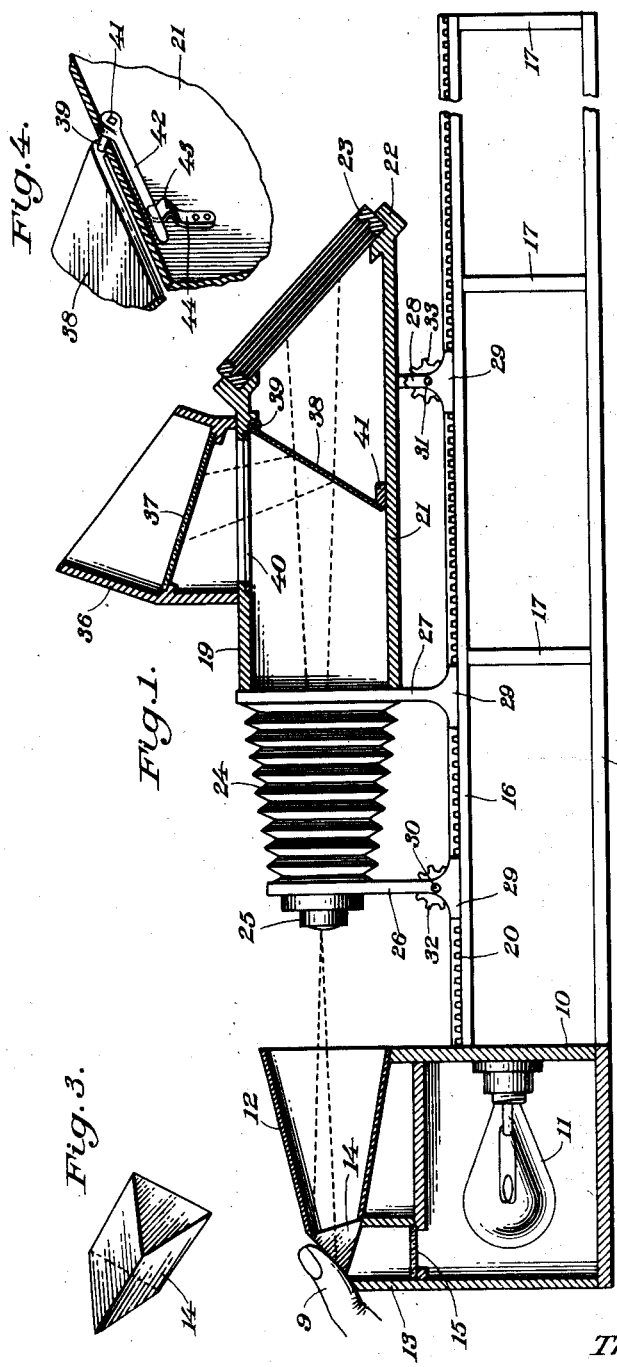
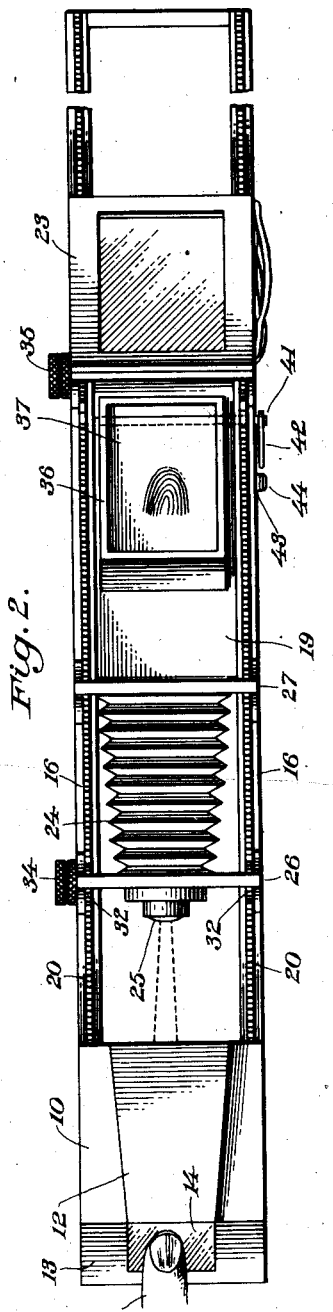
Theodore A. Johnson,
INVENTOR
BY Victor J. Evans & Co.
ATTORNEYS Patented Apr. 2, 1940

2,195,699

UNITED STATES PATENT OFFICE 2,195,699

PHOTOGRAPHIC FINGER PRINTING APPARATUS

Theodore A. Johnson, Worcester, Mass.

Application October 23, 1939, Serial No. 300,863

1 Claim. (Cl. 88—24)

This invention relates to photographic finger printing apparatus and has for an object to provide a simplified and economical apparatus for photographing one or more fingers or skin areas.

A further object is to provide apparatus adapted to make natural size photographs of the skin contours, through an illuminated prism, the camera portion of the apparatus being adjustable relative to the prism so that the negative can be increased or diminished in size as desired.

A further object is to provide, in apparatus of this character, a camera having a hinged member performing the function of a reflector for reflecting the image of the skin contour onto a ground glass for focusing the camera.

A further object of the invention is to provide apparatus of this character which will be formed of a few strong simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 1 is a side elevation, with parts in section, of photographic finger printing apparatus constructed in accordance with the invention.

Figure 2 is a top plan view of the apparatus shown in Figure 1.

Figure 3 is a detail perspective view of the prism.

Figure 4 is a fragmentary perspective view showing the operating lever and catch which controls the position of the reflector.

Referring now to the drawing in which like characters of reference designate similar parts in the various views, 10 designates a housing for a lamp bulb 11. A substantially frustro conical hood 12 is supported on top of the housing with its axis substantially horizontal. The housing is provided at the front of the top with a vertical extension 13, the upper end of which is formed to receive a prism 14 which closes the small end of the hood and which is exposed at one face to support the finger 9 which is to be photographed. The bottom face of the prism is exposed within the extension 13 to be illuminated by the bulb 11 through a ground or opal flashed glass 15 which is supported in horizontal position at the bottom of the extension and diffuses the light from the bulb.

A pair of bars 16 are supported in horizontal position by uprights 17 which rise from base bars 18 and form a frame to support the camera 19. The bars 16 and 18 are connected rigidly to the lamp housing 10 and the upper bars form track rails which are provided inwardly of their outer edges with respective racks 20.

The camera 19 comprises a lightproof elongated casing 21 which is open at the rear end and is provided with an upwardly and forwardly inclined adapter frame 22 for holding sensitized film such as a cut film holder 23. The front end of the casing is equipped with a bellows 24 having at the front end a conventional lens and shutter assembly.

The camera is supported by spaced inverted U-shaped frames 26, 27 and 28, the sides of which terminate at the bottom in elongated feet 29 which ride on the track rails 16 outside of the racks 20. Adjusting shafts 30 and 31 are journaled at the ends in the front and rear frames 26 and 28 and are provided with respective pinions 32 and 33 near the ends, which mesh with the racks 20. The ends of the shafts are equipped with respective buttons 34 and 35. The button 35 may be turned to adjust the casing 21 toward and away from the hood 12 while the button 34 may be turned to adjust lens 25 toward and away from the hood.

Mounted on the top of the casing 21 is a hood 36 having a downwardly inclined ground glass 37. The top of the casing below the ground glass is open as shown at 40. A mirror reflector is hinged at the upper end as shown at 39 to the top of the casing at the rear end of the opening 40. In reflecting position the mirror inclines downwardly and forwardly and bears against a stop 41 on the bottom of the casing. The image on the prism 14 is reflected as shown by dotted lines in Figure 1 through the opening 40 onto the ground glass 37. When an exposure is to be made the reflector 38 is rocked upwardly to a horizontal position to seal the opening 40 lightproof.

For operating the reflector the hinge pintle 41 thereof is equipped with a crank 42, the free end of which is adapted to be engaged on top of a hump 43 formed in a spring catch 44 which is secured to the side of the casing 21 as best shown in Figure 4. In this position of the crank 42 the reflector seals the opening 40 of the hood 36. The operator may dislodge the crank by pressing it downward over the hump 43 and dispose the reflector in reflecting position shown in Figure 1.

In operation the hood 12 shuts out outside light and other interferences from the front face of the prism. One or more fingers at a time are brought in contact with the prism which later is illuminated by the bulb 11. An image similar to a black and white print is formed on the rear face of the prism. The lens 25 of the camera is focused on the image formed on the prism. The operator may view the reflected image through the ground glass 37 to determine when the image is in focus. Then the camera is adjusted to properly focus the image for making the exposure.

To make the exposure the shutter in the lens is closed, the reflector 38 is rocked upward to seal the opening 40, and the slide in front of the film in the film holder 23 is withdrawn, the lens shutter lever is then pressed down and the exposure is made, the slide is then replaced in front of the film. This exposed film is replaced with another film, the reflector is rocked down and the lens opened for focusing.

From the above description it is thought that the construction and operation of the invention will be fully understood without further explanation.

What is claimed is:

An apparatus for photographing one or more fingers or skin areas comprising a lamp housing, a light source in said housing, a track connected to the housing, a camera on said track, a bellows, shutter and lens for the camera, a hood for the camera, a ground glass in said hood, sensitized film means carried by the rear open end of the camera, a reflector in the camera adapted to reflect an image from said lens onto said ground glass, a hood carried by said lamp housing, a prism in one end of the hood adapted to support the skin area to be photographed, said lens being focused on said prism through said hood, an extension on the housing permitting the light source to illuminate the prism, and a ground glass in the extension for diffusing the light on said prism.

THEODORE A. JOHNSON.